United States Patent
Cho et al.

(10) Patent No.: US 9,477,118 B2
(45) Date of Patent: Oct. 25, 2016

(54) METHOD OF MANUFACTURING DISPLAY APPARATUS

(71) Applicant: Samsung Display Co., Ltd., Yongin (KR)

(72) Inventors: Jung Kyoung Cho, Seongnam-si (KR); Hyejung Kwon, Namyangju-si (KR); DongHun Lee, Goyang-si (KR); Jeonguk Heo, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 199 days.

(21) Appl. No.: 13/959,082

(22) Filed: Aug. 5, 2013

(65) Prior Publication Data

US 2014/0307219 A1    Oct. 16, 2014

(30) Foreign Application Priority Data

Apr. 11, 2013    (KR) .................. 10-2013-0039947

(51) Int. Cl.
G02F 1/1339    (2006.01)
G02F 1/1341    (2006.01)

(52) U.S. Cl.
CPC ... *G02F 1/1339* (2013.01); *G02F 2001/13415* (2013.01)

(58) Field of Classification Search
CPC ..................... G02F 1/1341; G02F 1/1339
USPC ..................................... 349/153
See application file for complete search history.

(56) References Cited

U.S. PATENT DOCUMENTS

| 5,985,388 | A | 11/1999 | Tomita et al. |
| 8,223,308 | B2 * | 7/2012 | Zhao et al. .................. 349/153 |
| 8,717,513 | B2 * | 5/2014 | Park et al. ..................... 349/58 |
| 8,970,804 | B2 * | 3/2015 | Kwon et al. .................. 349/58 |
| 2012/0206669 | A1 * | 8/2012 | Kim ..................... G06F 1/1686 349/58 |
| 2012/0261074 | A1 | 10/2012 | Wang |

FOREIGN PATENT DOCUMENTS

| JP | 2011-053738 | 3/2011 |
| KR | 10-2006-0063145 | 6/2006 |
| KR | 10-2012-0090255 | 8/2012 |
| KR | 10-2012-0118205 | 10/2012 |

* cited by examiner

*Primary Examiner* — James Dudek
(74) *Attorney, Agent, or Firm* — H.C. Park & Associates, PLC

(57) ABSTRACT

A method of manufacturing a display apparatus, includes disposing a first sealing material along an edge of a first substrate, disposing a second sealing material in a first area disposed at a side of the first sealing material, disposing liquid crystal on the first substrate, disposing a second substrate on the first substrate, curing the first sealing material and the second sealing material to seal the liquid crystal between the first substrate and the second substrate, and disposing an image capturing device in association with the first area of the first substrate. The second sealing material is disposed on the first substrate along imaginary lines. Each imaginary line includes a start point and an end point. The second sealing material is disposed, in association with each imaginary line, from a respective start point toward a respective end point.

20 Claims, 3 Drawing Sheets

METHOD OF MANUFACTURING DISPLAY APPARATUS

CROSS-REFERENCE TO RELATED APPLICATION

This application claims priority from and the benefit of Korean Patent Application No. 10-2013-0039947, filed on Apr. 11, 2013, which is incorporated by reference for all purposes as if set forth herein.

BACKGROUND

1. Field

Exemplary embodiments relate to manufacturing technology, and, more particularly, to a manufacturing method of a display apparatus.

2. Discussion

Conventional liquid crystal displays are configured to generate an electric field between two substrates to, thereby, control an amount of light passing through a liquid crystal layer disposed between the two substrates. Control of the amount of light passing through the liquid crystal layer is utilized to facilitate the display of a desired image. To this end, a lower substrate of the two substrates of a traditional liquid crystal display may include gate lines, data lines, and pixel electrodes, which are disposed thereon, whereas an upper substrate of the two substrates of the traditional liquid crystal display may include a common electrode. The liquid crystal layer including liquid crystal molecules is typically disposed between the lower substrate and the upper substrate. The liquid crystal molecules are driven by the electric field generated in association with the pixel electrode and the common electrode. In this manner, the electric field may be utilized to control the amount of the light passing through the liquid crystal layer.

It is appreciated that liquid crystal displays are typically used as a display apparatus for various consumer electronics, such as, for example, television sets, computer systems, mobile phones, refrigerators, cooking appliances, etc. To this end, a traditional display apparatus may be provided with a built-in camera utilized in association with, for example, various video communications.

The above information disclosed in this Background section is only for enhancement of understanding of the background of the invention, and, therefore, it may contain information that does not form the prior art that is already known in this country to a person of ordinary skill in the art.

SUMMARY

Exemplary embodiments provide a method of manufacturing a display apparatus.

Additional aspects will be set forth in the detailed description which follows and, in part, will be apparent from the disclosure, or may be learned by practice of the invention.

According to exemplary embodiments, a method of manufacturing a display apparatus, includes: disposing a first sealing material along an edge of a first substrate, disposing a second sealing material in a first area disposed at a side of the first sealing material, disposing liquid crystal on the first substrate, disposing a second substrate on the first substrate, curing the first sealing material and the second sealing material to seal the liquid crystal between the first substrate and the second substrate, and disposing an image capturing device in association with the first area of the first substrate. The second sealing material is disposed on the first substrate along imaginary lines. Each imaginary line includes a start point and an end point. The second sealing material is disposed, in association with each imaginary line, from a respective start point toward a respective end point.

According to exemplary embodiments, a method of manufacturing a display apparatus, includes: disposing a first sealing material in a non-display area of a first substrate along an edge of a display area of the first substrate, the non-display area at least partially surrounding the display area, disposing a second sealing material in a first area of the non-display area, disposing liquid crystal in the display area, disposing a second substrate on the first substrate, curing the first sealing material and the second sealing material to seal the liquid crystal between the first substrate and the second substrate, and disposing an image capturing device in association with the first area. The second sealing material is disposed on the first area by a nozzle that dispenses the second sealing material along imaginary lines. Each imaginary line includes a start point and an end point. The nozzle starts dispensing the second sealing material at respective start points of the imaginary lines and stops dispensing the second sealing material at respective end points of the imaginary lines.

According to exemplary embodiments, the display apparatus may be manufactured to prevent (or otherwise reduce) bubbles from being generated in a sealing material and/or a display area. In this manner, the display quality of the display apparatus may be improved.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
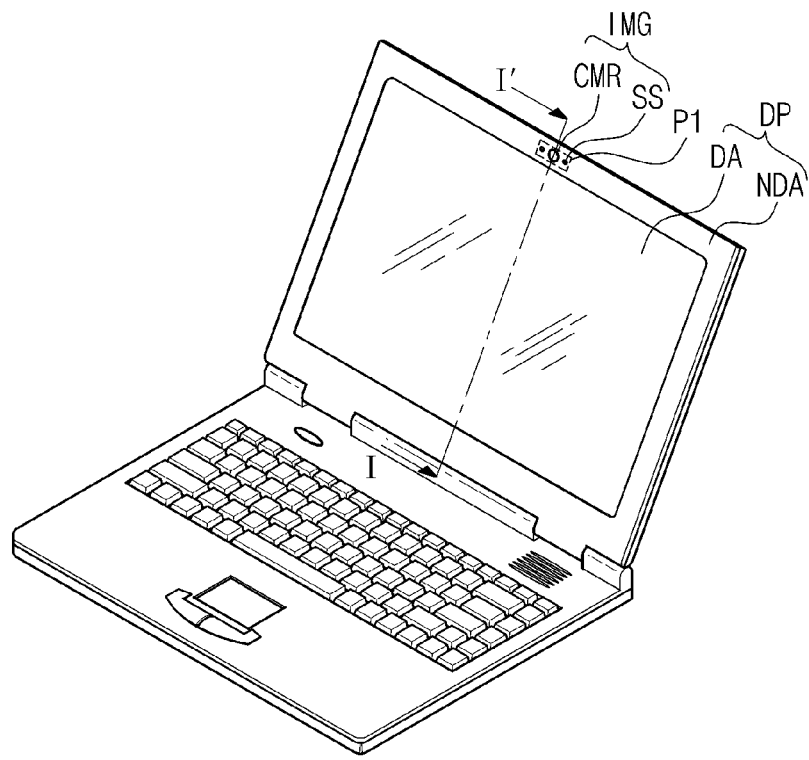
FIG. 1 is a perspective view of a display apparatus, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
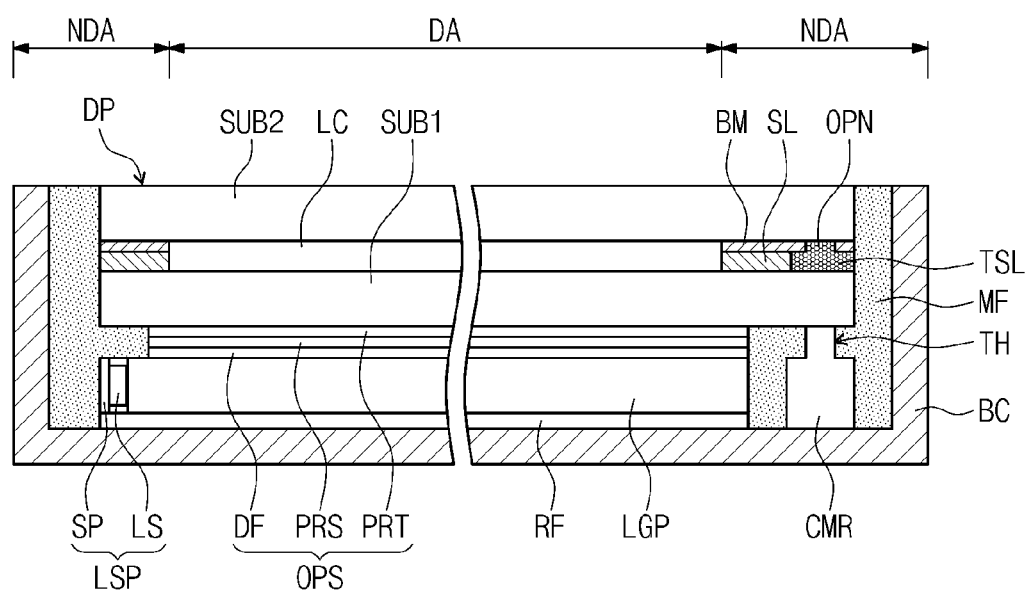
FIG. 2 is a cross-sectional view of the display apparatus of FIG. 1 taken along sectional line I-I', according to exemplary embodiments.

FIG. 1 is a perspective view of a display apparatus, according to exemplary embodiments. FIG. 2 is a cross-sectional view of the display apparatus of FIG. 1 taken along sectional line I-I'. For the convenience of explanation, FIG. 1 shows a notebook computer employing the display apparatus, but the display apparatus may be utilized in association with various consumer electronics, such as, for example, personal computer, mobile terminal, television set, refrigerator, cooking appliance, billboard, manufacturing equipment, industrial appliance, etc.

Referring to FIGS. 1 and 2, the display apparatus includes a display panel DP, a backlight unit, an imaging unit IMG, and a bottom chassis BC. While specific reference will be made to this particular implementation, it is also contemplated that the display apparatus may embody many forms and include multiple and/or alternative components. For example, it is contemplated that the components of the display apparatus may be combined, located in separate structures, and/or separate locations. For descriptive purposes, a direction to which an image is provided via the display apparatus is referred to as an "upper direction," and a direction opposite to the upper direction is referred to as a "lower direction," but each of the upper and lower directions are not be limited thereto or thereby.

According to exemplary embodiments, the display panel DP is configured to display an image. The display panel DP may be not a self-emissive display panel and manufactured by, for instance, sealing two substrates with liquid crystal disposed therebetween. In this manner, display DP may be or include any suitable display panel, such as, for example, a liquid crystal display (LCD) panel, an electroluminescent display (ELD) panel, an electrowetting display (EWD) panel, an electrophoretic display (EPD) panel, a microelectromechanical system (MEMS) display panel, etc. To facilitate the description of exemplary embodiments described herein, the display panel DP is described as an LCD panel.

The display panel DP may have any suitable shape, such as, for instance, a rectangular plate shape with two pairs of sides meeting at right angles, and one of the two pairs of sides being longer than the other. For example, the display panel DP may have the rectangular plate shape with a pair of long sides and a pair of short sides. The display panel DP includes a first substrate SUB1 and a second substrate SUB2 facing the first substrate SUB1.

The display panel DP includes a display area DA, in which an image is displayed, and a non-display area NDA, in which the image is not displayed when viewed in a plan view. It is noted that the non-display area may surround (or otherwise bound) the display area DA. A black matrix (or light blocking part) BM is disposed in the non-display area NDA of the second substrate SUB2 to block unwanted light. The black matrix BM is disposed in the non-display area NDA along a circumference of the display area DA of the second substrate SUB2, and includes an opening portion OPN corresponding to the imaging unit IMG. In other words, the black matrix BM is not formed in the opening portion OPN.

According to exemplary embodiments, the first substrate SUB1 includes a plurality of pixel electrodes (not shown) and a plurality of thin film transistors (not shown) electrically connected to the pixel electrodes in, for example, a one-to-one correspondence. Each thin film transistors switch a driving signal applied to a corresponding pixel electrode. In addition, the second substrate SUB2 includes a common electrode (not shown) that forms an electric field in cooperation with the pixel electrodes to control an arrangement of liquid crystal molecules (not shown) of a liquid crystal layer LC. In this manner, the liquid crystal layer LC may be driven to facilitate the display of an image in the upper direction, e.g., in a direction away from the bottom chassis BC.

As seen in FIG. 2, a main sealing part SL, a transparent sealing part TSL, and the liquid crystal layer LC may be disposed between the first substrate SUB1 and second substrate SUB2.

The main sealing part SL surrounds the liquid crystal layer LC along an edge of the first substrate SUB1 when viewed in a plan view. In this manner, the liquid crystal molecules of the liquid crystal layer LC may be sealed from the exterior, as well as contaminants thereof. The main sealing part SL includes a main sealing material formed of any suitable material, such as, for example, an organic polymer. The main sealing part SL may be non-transparent.

The transparent sealing part is disposed in correspondence with the imaging unit IMG when viewed in a plan view. In this manner, the transparent sealing part TSL is disposed in correspondence with the opening portion OPN, and, thereby, may completely cover the opening portion OPN when viewed in a plan view. The transparent sealing part TSL is disposed adjacent to the liquid crystal layer LC, such that the main sealing part SL may be disposed between the liquid crystal layer LC and the transparent sealing part TSL. The transparent sealing part TSL includes a transparent sealing material formed of any suitable material, such as, for instance, an organic polymer.

According to exemplary embodiments, the backlight unit is at least disposed under the display panel DP and configured to supply light to the display panel DP. Additionally (or alternatively), the backlight unit may include one or more edge lighting portions. The backlight unit may include a mold frame MF configured to support the display panel DP, a light source part LSP including light sources configured to emit light, optical sheets OPS configured to improve the transmission efficiency of the light, and a reflective sheet RF configured to change a direction in which propagating light travels, e.g., reflect incident light in the upper direction.

As seen in FIG. 2, the mold frame MF is provided along the edge of the display panel DP and is disposed under the display panel DP to support the display panel DP. The mold frame MF may include a fixing member, e.g., a catching jaw, to fix or support the light source part LSP and the optical sheets OPS. For instance, the fixing member may include or relate to that portion of the mold frame MF projecting towards the optical sheets OPS. Further, the mold frame MF includes a receiving space in which the imaging unit IMG is accommodated or otherwise supported. The mode frame MF is provided with a thru-hole TH formed therethrough in correspondence with the imaging unit IMG.

In exemplary embodiments, the mold frame MF is provided in correspondence with four sides of the display panel DP or at least a portion of the four sides. It is noted, however, that when the display panel DP is configured in association with an alternative shape, the correspondence of the mold frame MF would be respectively modified therewith. For instance, the mold frame MF has a rectangular ring shape to correspond to the four sides of the display panel DP or a laid-U shape to correspond to three sides of the display panel DP. The mold frame MF may be integrally formed as a single unitary and individual unit or formed in plural parts.

The mold frame MF may be formed of any suitable material, such as, for example, an organic material, e.g., polymer resin.

The light source part LSP is configured to supply light to the display panel DP. The light source part LSP includes a plurality of light sources LS and a supporter SP configured to support the light sources LS. The supporter SP may be, but not limited to, a printed circuit board (PCB) with wirings configured to apply a source voltage to the light sources LS, and, thereby, configured to control the light sources LS. The supporter SP may have a rectangular plate shape extended in a determined direction; however, it is contemplated that the supporter SP may be formed in any suitable shape.

Each light source LS may be any suitable light source, such as, for example, a point light source, a line light source, or a surface light source. For descriptive purposes, the point light source, e.g., a light emitting diode, will be described in association with exemplary embodiments described herein. In this manner, a plurality of light emitting diodes may be provided as light sources LS and the light emitting diodes may be arranged in a line on the supporter SP. In exemplary embodiments, the light source LS is a minimum light emitting unit, which is able to individually control an amount of light emitted therefrom. As such, one light source may be configured to include one light emitting diode or plural light emitting diodes of which the brightness of the various light emitting diodes may be substantially simultaneously controlled. To this end, the light sources LS may be controlled to provide "local dimming effects." It is contemplated that the supporter SP may be omitted, and a separate supporting member to support the light sources LS and/or separate wirings to apply the source voltage to the light sources may be provided or otherwise utilized.

The optical sheets OPS are disposed between a light guide plate LGP and the display panel DP. The optical sheets OPS may be configured to control (or otherwise direct) light emitted from the light sources LS. The optical sheets OPS include a diffusion sheet DF, a prism sheet PRS, and a protective sheet PRT, which are sequentially stacked on the light guide plate LGP. It is contemplated; however, that the optical sheets OPS may include any suitable number and/or configuration of the aforementioned sheets, additional sheets, and/or alternative sheets.

The diffusion sheet DF is configured to diffuse incident light. The prism sheet PRS is configured to condense incident light diffused by the diffusion sheet DS to allow light exiting from the diffusion sheet DF to travel in a direction substantially vertical to the display panel DP, e.g., towards an observer. Light exiting from the prism sheet PRS is vertically incident to the display panel DP. The protective sheet PRT is disposed on the prism sheet PRS to protect the prism sheet PRS from external impacts, contaminants, etc. In exemplary embodiments, the optical sheets OPS are configured to include one diffusion sheet DF, one prism sheet PRS, and one protective sheet PRT, but exemplary embodiments are not limited thereto or thereby. That is, at least one of the diffusion sheet DF, the prism sheet PRS, and the protective sheet PRT of the optical sheets OPS may be provided in plural number, or one or more of the diffusion sheet DF, the prism sheet PRS, and the protective sheet PRT may be omitted from the optical sheets OPS. It is also contemplated that one or more other sheets may be utilized. In addition, the stack order of the diffusion sheet DF, the prism sheet PRS, and the protective sheet PR may be changed.

The reflective sheet RF is disposed under the light source part LSP to reflect light leaked from the light source part LSP that was not directed to the display panel DP to allow such light to be redirected towards the display panel DP. As seen in FIG. 2, the reflective sheet RF is disposed on the bottom chassis BC to reflect the light. In this manner, the amount of light traveling towards the display panel DP may be increased by the reflective sheet RF. While only one reflective sheet RF is illustrated, it is contemplated that any suitable number of the reflective sheets RF may be utilized. It is also contemplated that that the reflective sheet RF may itself be a multilayered structure to increase the amount of light redirected towards the display panel DP. It is also contemplated that the reflective sheet RF may be omitted and an upper surface of the bottom chassis BC may be a suitable reflective surface or be coated with any suitable reflective material.

The imaging unit IMG includes any suitable mechanism for capturing images, such as, for example, a camera CMR, charge-coupled device (CCD), etc. For descriptive purposes, exemplary embodiments described in association with camera CMR. The camera CMR includes at least one lens (not shown) and an image sensor (not illustrated) to convert an image signal to an electric signal. In exemplary embodiments, the imaging unit IMG may further include a sensor SS to sense optical signals other than the image signal. To this end, the imaging unit IMG includes the camera CMR and one or more sensors SS disposed at, for instance, both sides (e.g., lateral sides) of the camera CMR. The imaging unit IMG is configured to pick up light provided through the second substrate SUB2, the opening portion OPN of the black matrix BM, the transparent sealant part TSL, the first substrate SUB1, and the thru-hole TH of the mold frame MF.

The bottom chassis BC is disposed under the display panel DP to accommodate (or otherwise support) the display panel DP, the mold frame MF, the light source part LSP, the optical sheets OPS, the reflective sheet RF, and the imaging unit IMG.

Although not shown in the drawings, the display panel DP may further include a driving chip to apply the driving signal to the display panel DP, a tape carrier package on which the driving chip is mounted, and a printed circuit board electrically connected to the display panel DP through the tape carrier package. The printed circuit board may be placed at various positions. For instance, the printed circuit board may be disposed on an outer surface of the bottom chassis BC, and the tape carrier package may be bent along the outer surface of the bottom chassis BC to connect the display panel DP and the printed circuit board together. The driving chip is configured to generate the driving signal in response to a signal (e.g., external signal) to drive the display panel DP. The external signal may be provided from the printed circuit board and may include image signals, control signals, and driving voltages. In addition, the imaging unit IMG may be connected to the printed circuit board using separate wiring and driven by signals from the printed circuit board.

A method of manufacturing the display apparatus will be described with reference to FIGS. 1 and 2.

The first substrate SUB1 is prepared. The first substrate SUB1 is manufactured by, for example, preparing a first base substrate (not shown) and forming thin film transistors and pixel electrodes connected to the thin film transistors on the first base substrate.

The second substrate SUB2 is prepared. The second substrate SUB2 is manufactured by, for instance, preparing a second base substrate and forming, e.g., sequentially forming, the black matrix BM and the common electrode on the second base substrate.

A main sealing material to form the main sealing part SL and the transparent sealing material to form the transparent sealing part TSL are coated on either the first substrate SUB1 or the second substrate SUB2. In exemplary embodiments, the main sealing material and the transparent sealing material are coated on the first substrate SUB1.

The main sealing material is provided in, for instance, a fluid form and includes an organic polymer curable by heat or light. The main sealing material is coated in the non-display area NDA along the edge of the display area DA of the first substrate SUB1.

In exemplary embodiments, the transparent sealing material is provided in a fluid form and includes an organic polymer curable by heat or light. The transparent sealing material is coated in the area corresponding to the imaging unit IMG. The transparent sealing material is coated outside the main sealing material. A method of coating the transparent sealing material will be described in more detail in association with FIGS. 3-5.

It is noted that the order of forming the main sealing material and the transparent sealing material are not limited to the specific order previously described. That is, the main sealing material may be formed before or after forming the transparent sealing material.

The liquid crystal layer LC is formed on the first substrate SUB1 on which the main sealing material is coated. The liquid crystal layer LC is formed by, for instance, dropping liquid crystals on the first substrate SUB1, e.g., via a one-drop filling (ODF) method. It is contemplated; however, that any other suitable process may be utilized.

After the second substrate SUB2 is disposed to face the first substrate SUB1, such that the liquid crystal layer LC is disposed between the first substrate SUB1 and the second substrate SUB2, the main sealing material and the transparent sealing material are cured to form the main sealing part SL and the transparent sealing part TSL. In this manner, the liquid crystal layer LC is sealed by way of the main sealing part SL.

The imaging unit IMG is disposed under the area of the first substrate SUB1, which corresponds to the transparent sealing part TSL.

Figure 3:
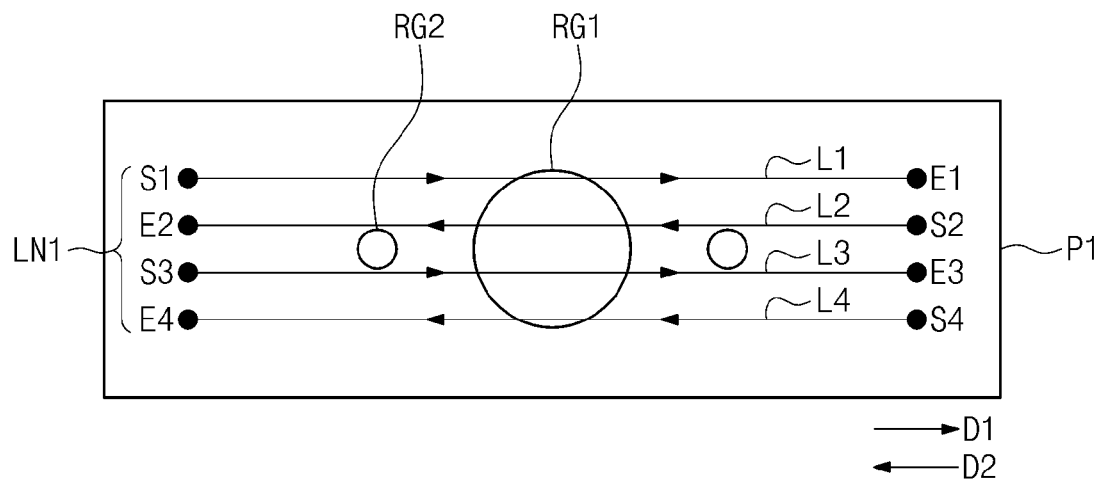
FIG. 3 is a plan view of a method of coating a transparent sealant in an area P1 of the display apparatus of FIG. 1, according to exemplary embodiments.

FIG. 3 is a plan view of a method of coating a transparent sealant in an area P1 of the display apparatus of FIG. 1 according to exemplary embodiments.

Referring to FIGS. 1 to 3, the transparent sealing material is coated in the area corresponding to the imaging unit IMG. In exemplary embodiments, the area corresponding to the imaging unit IMG is configured to include a first area RG1 corresponding to the camera and at least one second area RG2 corresponding to the sensor(s) SS.

The transparent sealing material is discharged on the first substrate SUB1 through, for instance, nozzles (not shown) moving along predetermined imaginary lines. Ends of the imaginary lines at which the discharging of the transparent sealing material starts may be referred to as start points, whereas points at which the discharging of the transparent sealing material stops may be referred to as end points. In this manner, the transparent sealing material is provided as line shapes overlapped with the imaginary lines and each of the imaginary lines have a start point (e.g., S1 to S4) and an end point (e.g., E1 to E4). Since the transparent sealing material is a fluid, the transparent sealing material may be dispersed in a direction vertical to the coating direction when the transparent sealing material is coated, and, as such, the transparent sealing material may be coated exhibiting a determined coating width.

The lines of the transparent sealing material include first lines LN1 having plural lines arranged in parallel to each other. In exemplary embodiments, the first lines LN1 include a number of sub-lines, e.g., four sub-lines, such as, for example, first, second, third, and fourth sub-lines L1, L2, L3, and L4. The number of the sub-lines of the first lines LN1 may be any suitable number, and the number of the sub-lines of the first lines LN1 may be established (or changed) depending on the size of the first and second areas RG1 and RG2, a diameter of the nozzle utilized to dispense the transparent sealing material, a viscosity of the transparent sealing material, etc.

The first to fourth sub-lines L1 to L4 are parallel (or substantially parallel) to each other. A distance (or spacing) between adjacent sub-lines of the first to fourth sub-lines L1 to L4 may be uniform. Since the transparent sealing material is a fluid, the transparent sealing material is dispersed along the first to fourth sub-lines L1 to L4, and, as such, the transparent sealing material may be completely coated between two adjacent sub-lines. The distance between the adjacent sub-lines to each other of the first to fourth sub-lines L1 to L4 may be set depending on the diameter of the nozzles and the viscosity of the transparent sealing material utilized.

According to exemplary embodiments, the start points of the first to fourth sub-lines L1 to L4 may be referred to as start points S1, S2, S3, and S4, respectively, and the end points of the first to fourth sub-lines L1 to L4 may be referred to as end points E1, E2, E3, and E4, respectively. In this manner, the start points (e.g., S1 and S2) of sub-lines (e.g., L1 and L2) adjacent to each other may be disposed at opposite sides (e.g., lateral sides) of the first area RG1. In addition, the end points (e.g., E1 and E2) of sub-lines (e.g., L1 and L2) adjacent to each other may be disposed at opposite sides (e.g., lateral sides) with respect to the first area RG1. That is, when the direction in which the transparent sealing material is coated along the first sub-line L1 is referred to as a first direction D1, the transparent sealing material is coated along the second sub-line L2 in a second direction D2 opposite to the first direction D1, e.g., 180° opposite to the first direction D1. In this manner, the third sub-line L3 of the transparent sealing material may be coated along the first direction D1, such that the fourth sub-line L4 may be coated along the second direction D2.

In exemplary embodiments, the first to fourth sub-lines L1 to L4 may be sequentially or simultaneously formed. When the nozzle from which the transparent sealing material is discharged is one, the first to fourth sub-lines L1 to L4 may be sequentially formed. When the nozzle from which the transparent sealing material is discharged is two, the first and third sub-lines L1 and L3 may be coated along the first direction D1, and the second and fourth sub-lines L2 and L4 may be coated along the second direction D2. Alternatively, the first and second sub-lines L1 and L2 may be coated in opposite directions D1 and D2, such that the third and fourth sub-lines L3 and L4 may be also coated in opposite directions D1 and D2. When the nozzle from which the transparent sealing material is discharged is four, the first to fourth lines L1 to L4 may be simultaneously formed.

As seen in FIG. 3, the sub-lines L1 to L4 of the first lines LN1 have the same length, but it is contemplated that the sub-lines L1 to L4 may be of one or more different lengths. For instance, each of the sub-lines L1 to L4 of the first lines LN1 may have different lengths. As another example, the length of each of the second and third sub-lines L2 and L3 may be shorter than the length of each of the first and fourth sub-lines L1 and L4.

According to exemplary embodiments, when the imaging unit IMG includes only the camera CMR, the first lines LN1 may be disposed to cover the first area RG1. When the imaging unit IMG includes the camera CMR and the one or more sensors SS, the first lines LN1 may extend in the first and second directions D1 and D2 to cover the first area RG1 and the second area RG2.

According to exemplary embodiments, since the start points and the end points are disposed at opposite sides (e.g., lateral sides) relative to each other in adjacent sub-lines, the transparent sealing material may be uniformly coated. The transparent sealing material may have a determined viscosity according to its composition, and, in this manner, the amount discharged at a start point may be different from the amount discharged at an end point. For instance, the amount discharged at a start point may be greater than the amount discharged at an end point. As such, when a start point is placed at only one side of the imaging unit, the transparent sealing material may be over-coated at the one side of the imaging unit IMG. As a result, the sealing material adjacent to the over-coated transparent sealing material may be pushed out by the over-coated transparent sealing material, so that a width of the area in which the sealing material is coated is decreased. To this end, the sealing effect of the liquid crystal layer LC may be diminished. The corollary is that the transparent sealing material may be under-coated at the other side of the imaging unit IMG, such that bubbles may be formed in areas in which the transparent sealing material is not formed. However, the transparent sealing material may be uniformly coated at both sides of the imaging unit IMG according to exemplary embodiments.

In addition, since the transparent sealing material may be prevented (or otherwise reduced) from being over-coated at one side of the imaging unit IMG, the force exerting on the main sealing material by the transparent sealing material may be reduced or otherwise prevented. For instance, since the main sealing material and the transparent sealing material are coated to make contact with each other, if there exists over-coated transparent sealing material, then the over-coated transparent sealing material may be dispersed where the main sealing material is to be coated. In this manner, the width of the main sealing material becomes narrow. When the main sealing material is cured under such a state that the width of the main sealing material becomes narrower, the main sealing part SL may collapse or crack. To this end, the main sealing part SL will not completely seal the liquid crystal layer LC. In this manner, air infiltrates the liquid crystal layer LC through the collapse or crack of the main sealing part SL, such that bubbles may be formed in the liquid crystal layer LC. When the bubbles have a diameter of about 10 micrometers or more, the bubbles may be perceived by an observer. However, the width of the main sealing material may be prevented from being reduced, and, as such, the bubbles may be prevented from being generated in the display area DA.

Figure 4:
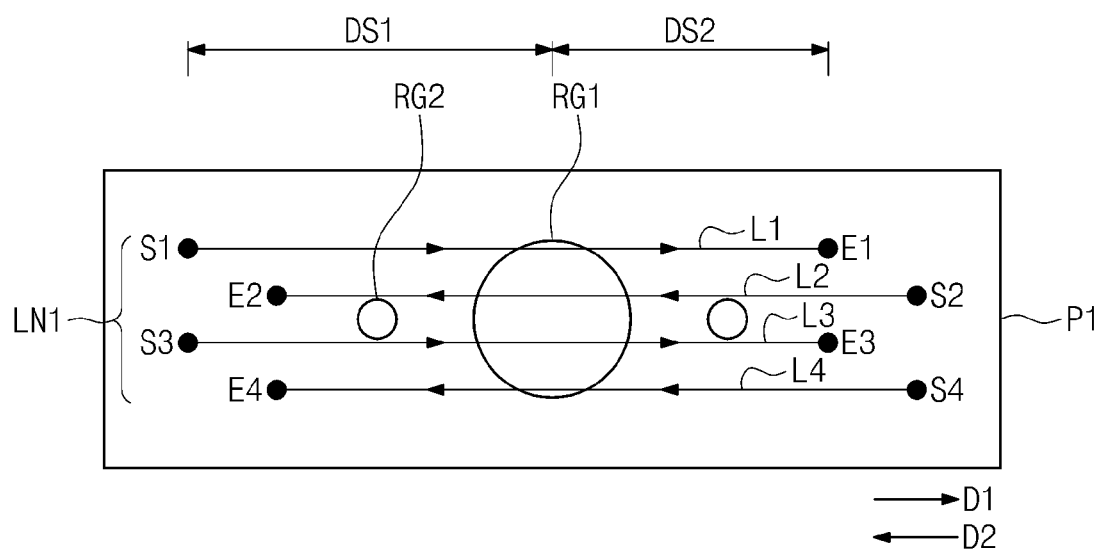
FIG. 4 is a plan view of a method of coating a transparent sealant in an area P1 of the display apparatus of FIG. 1, according to exemplary embodiments.

FIG. 4 is a plan view of a method of coating a transparent sealant in an area P1 of the display apparatus of FIG. 1 according to exemplary embodiments.

Referring to FIG. 4, in each sub-line L1 to L4 of the first lines LN1, a distance between the start point and the first area RG1 is different from a distance between the end point and the first area RG1. For instance, as shown in FIG. 4, the distance between the first area RG1 and the start point is greater than the distance between the first area RG1 and the end point. Here, the distance from the first area RG1 to a corresponding start or end point is the distance between a line segment crossing a center portion of the first area RG1 and a parallel line segment passing through the corresponding start or end point.

The distance between the first area RG1 and the start points S1, S2, S3, and S4 of the first to fourth sub-lines L1, L2, L3, and L4 may be referred to as a first distance DS1 and the distance between the first area RG1 and the end points E1, E2, E3, and E4 of the first to fourth sub-lines L1, L2, L3, and L4 may be referred to as a second distance DS2, the first distance DS1 may be greater than the second distance DS2. As such, in one side portion of the first area RG1, the start points S1 and S3 of the first and third sub-lines L1 and L3 are spaced relatively far from the first area RG1 and the end points E2 and E4 of the second and fourth sub-lines L2 and L4 are relatively closer to the first area RG1 than the start points S1 and S3. In the other side portion of the first area RG1, the start points S2 and S4 of the second and fourth sub-lines L2 and L4 are spaced relatively far from the first area RG1 and the end points E1 and E3 of the first and third sub-lines L1 and L3 are relatively closer to the first area RG1 than the start points S2 and S4.

According to exemplary embodiments, the transparent sealing material may be uniformly coated since the start and end points are disposed at sides (e.g., lateral sides) in adjacent sub-lines and the start and end points of the adjacent sub-lines are spaced apart from the first area RG1 by different distances. The amount of the transparent sealing material discharged at the start and end points may be different from the amount discharged at the straight line portion between the start and end points. For example, the amount discharged of the transparent sealing material at the start and end points may be greater than the amount discharged at the straight line portion. In exemplary embodiments, the start points and the end points are dispersed, such that the transparent sealing material may be uniformly coated. In this manner, bubbles may be prevented (or otherwise reduced) from being formed in the transparent sealing material and the width of the main sealing part SL adjacent to the transparent sealing part TSL may be maintained. To this end, bubbles may be prevented or otherwise reduced from being generated in the display area DA.

Figure 5:
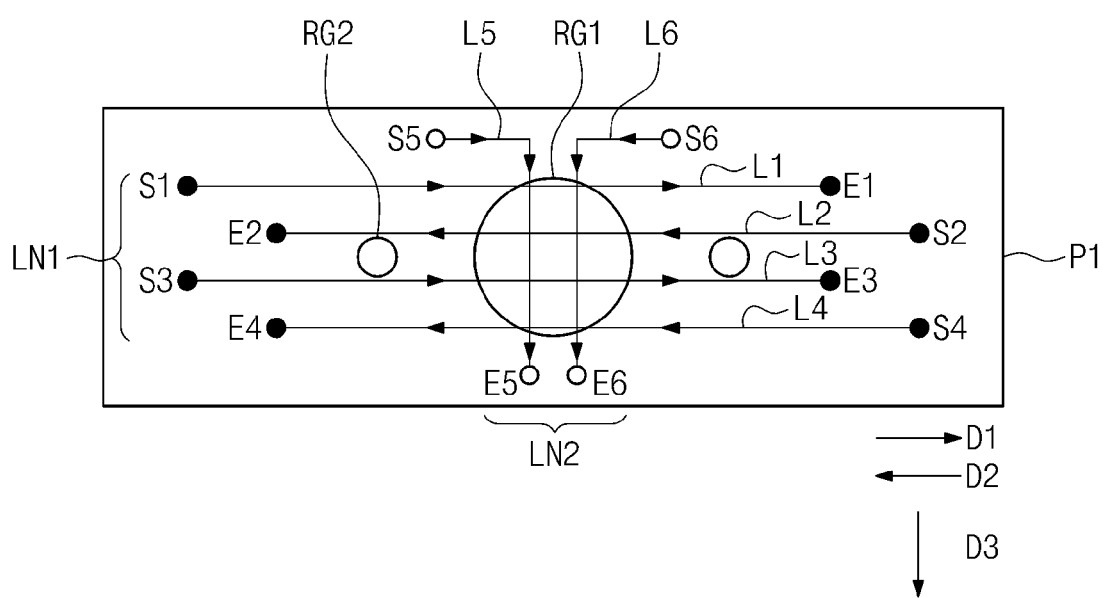
FIG. 5 is a plan view of a method of coating a transparent sealant in an area P1 of the display apparatus of FIG. 1, according to exemplary embodiments.

FIG. 5 is a plan view of a method of coating a transparent sealant in an area P1 of the display apparatus of FIG. 1 according to exemplary embodiments.

Referring to FIG. 5, the sub-lines L1 to L6 of the transparent sealing material include the first lines LN1 including the sub-lines L1 to L4 arranged parallel (or substantially parallel) to each other and one or more second lines LN2 including at least one sub-line (e.g., sub-lines L5 and L6) crossing the first lines LN1. As seen in FIG. 5, the second lines LN2 include two sub-lines, e.g., a fifth sub-line L5 and a sixth sub-line L6, but the number of the sub-lines of the second line(s) LN2 are not limited thereto or thereby. The number of the sub-lines of the second line LN2 may be determined depending on the size of the first and second areas RG1 and RG2, the diameter of the nozzle(s) utilized to dispense the transparent sealing material, and viscosity of the transparent sealing material.

According to exemplary embodiments, the second lines LN2 partially cross the first lines LN1. For instance, at least a portion of the second lines LN2 vertically crosses the first lines LN1. Referring to FIG. 5, a portion of each of the fifth sub-line L5 and the sixth sub-line L6 extends in a third direction D3 to vertically (e.g., perpendicularly) cross the first to fourth sub-lines L1 to L4, which extend in the first direction D1. In this manner, a remaining portion of each of the fifth and sixth sub-lines L5 and L6 may extend in the first direction D1 or the second direction D2, and, as such, the remaining portion of each of the fifth and sixth sub-lines L5 and L6 may be disposed parallel (or substantially parallel) to the first to fourth sub-lines L1 to L4.

The fifth and sixth sub-lines L5 and L6 may be symmetrical to each other with respect to a straight line crossing the center portion of the first area RG1 and perpendicular to the first direction D1. In addition, each first line LN1 may be longitudinally longer than the portion of each second line LN2, which is vertical to the first lines LN1.

According to exemplary embodiments, the transparent sealing material may be coated in the third direction D3 along the second lines LN2, and, in this manner, bubbles may be prevented (or otherwise reduced) from being generated in the first lines LN1. That is, when the first lines LN1 are extended in the first and second directions D1 and D2, the transparent sealing material may not be coated between the adjacent subs-lines along the first and second directions D1 and D2. However, since the transparent sealing material is coated in the third direction D3 along the second lines LN2, the transparent sealing material may be uniformly coated without bubbles.

As described above, when the transparent sealing material is uniformly coated on the first substrate, the bubbles may be prevented (or otherwise reduced) from being formed in the transparent sealing material. In addition, the transparent sealing material may be prevented (or otherwise reduced) from being over-coated or under-coated, so that the width of the main sealing part SL may be prevented (or otherwise reduced) from being narrowed.

The following Table 1 represents data obtained by inspecting a number of display panels in which bubbles were generated in the transparent sealing part TSL or in the display area DA when a conventional display panel was loaded into a chamber and a pressure in the chamber was decompressed. The decompression test was performed to inspect reliability of the main sealing part SL and the transparent sealing part TSL, and a worst case stress condition associated with the pressure in the decompression chamber was utilized.

An inspection environment of each display panel was uniformly maintained. In the display apparatus, when an amount of the liquid crystal accommodated in the display area DA surrounded by the main sealing part SL is 100%, the display area DA has been filled with the liquid crystal by about 95%, about 97%, and about 99%. The display panel DP has been inspected ten or eleven times, and fourteen or fifteen display panels DP have been inspected in each inspection time. In Table 1, an inspected display panel DP indicates the number of the display panels DP that have been inspected, and a defected display panel DP indicates the number of display panels DP in which the bubbles were generated. The bubbles have a diameter of about 10 micrometers or more, which corresponds to a minimum size that may be perceived by an observer under normal (e.g., unaided) viewing conditions. In addition, the term "beginning" indicates the number of the display panels DP in which the bubbles were generated before the pressure in the chamber was decompressed.

TABLE 1

| | Amount of liquid crystal is about 95% (a defected panel/an inspected panel) | Amount of liquid crystal is about 97% (a defected panel/an inspected panel) | Amount of liquid crystal is about 99% (a defected panel/an inspected panel) |
|---|---|---|---|
| 1 | 0/15 | 3/15 | 0/15 |
| 2 | 1/15 | 0/15 | 7/15 |
| 3 | 0/15 | 0/15 | 8/15 |
| 4 | 0/15 | 0/14 | 1/15 |
| 5 | 0/14 | 0/14 | 0/15 |
| 6 | 0/15 | 0/15 | 0/15 |
| 7 | 1/15 | 0/15 | 0/15 |
| 8 | 12/15 (beginning 1) | 0/15 | 0/14 |
| 9 | 15/15 (beginning 11) | 3/15 | 0/15 |
| 10 | 15/15 (beginning 14) | — | 0/15 |
| 11 | — | — | 0/15 |

As shown in Table 1, bubbles were more frequently generated in the transparent sealing part TSL or in the display area DA regardless of the amount of the liquid crystal utilized. In particular, when the amount of the liquid crystal is about 95%, the bubbles were generated before the pressure in the chamber was decompressed, and the defect occurred in all the display panels DP after the pressure in the chamber was decompressed. When the amount of the liquid crystal was about 97%, the defect occurred in three display panels DP at the first inspection time, and when the amount of the liquid crystal is about 99%, the defect occurred in seven display panels DP of the fifteen display panels DP at the second inspection time and in eight display panels DP of the fifteen display panels DP at the third inspection time.

The following Table 2 represents data obtained by inspecting the number of display panels DP in which bubbles were generated in the transparent sealing part TSL or in the display area DA when the display panel was manufactured in accordance with exemplary embodiments described in association with FIG. 5 and were loaded into the chamber and the pressure in the chamber was decompressed. The inspection environment was the same as with the results obtained in association with Table 1.

TABLE 2

| | Amount of liquid crystal is about 95% (a defected panel/an inspected panel) | Amount of liquid crystal is about 97% (a defected panel/an inspected panel) | Amount of liquid crystal is about 99% (a defected panel/an inspected panel) |
|---|---|---|---|
| 1 | 0/15 | — | 0/15 |
| 2 | 0/15 | 0/15 | 0/15 |
| 3 | 0/15 | 0/15 | 0/15 |
| 4 | 0/15 | 0/15 | 0/15 |
| 5 | 0/14 | 0/15 | 0/15 |
| 6 | 0/15 | 0/15 | 0/15 |
| 7 | 1/15 | 0/15 | 0/15 |
| 8 | 0/15 | 0/15 | 0/14 |
| 9 | 0/15 | 0/15 | 0/15 |
| 10 | 2/15 | — | 0/15 |

As shown in Table 2, the frequency of occurrence of the bubbles in the transparent sealing part TSL or in the display area DA was very low when compared to that of the conventional display panel DP. In particular, when the amount of the liquid crystal is about 95%, the defect occurred at the seventh and tenth inspection times, but the number of the display panels DP in which the defect occurred becomes extremely smaller than that of the conventional display panel DP.

As described above, the defect caused by bubbles is reduced, and, as such, the display apparatus may have improved display quality.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method of manufacturing a display apparatus, comprising:
   disposing a first sealing material along an edge of a first substrate;
   disposing a second sealing material in a first area disposed at a side of the first sealing material;
   disposing liquid crystal on the first substrate;
   disposing a second substrate on the first substrate;
   curing the first sealing material and the second sealing material to seal the liquid crystal between the first substrate and the second substrate; and
   disposing an image capturing device to overlap with the second sealing material in the first area of the first substrate, the second sealing material overlapping with a light receiving aperture of the image capturing device,
   wherein the second sealing material is disposed on the first substrate along imaginary lines, each imaginary line comprising a start point and an end point, and the second sealing material being disposed, in association with each imaginary line, from a respective start point toward a respective end point, and
   wherein the second sealing material overlapping with the image capturing device in the first area is in direct contact with the first sealing material.

2. The method of claim 1, wherein the imaginary lines comprise:
   a first group of imaginary lines arranged substantially parallel to one another,
   wherein the start point of each respective imaginary line of the first group is disposed closer to the end point of an adjacent imaginary line of the first group than its own end point, and
   wherein the start points of the imaginary lines of the first group are disposed to alternate in association with at least two sides of the first substrate.

3. The method of claim 2, wherein a distance between the respective start points of each of the imaginary lines of the first group and the first area is different from a distance between the respective end points of each of the imaginary lines of the first group and the first area.

4. The method of claim 2, wherein the imaginary lines further comprise:
   at least one second imaginary line at least partially crossing the imaginary lines of the first group.

5. The method of claim 4, wherein at least a first portion of the at least one second imaginary line is substantially perpendicular to the imaginary lines of the first group.

6. The method of claim 5, wherein at least a second portion of the at least one second imaginary line is substantially parallel to the imaginary lines of the first group.

7. The method of claim 5, wherein each of the imaginary lines of the first group is longer than the first portion of the at least one second imaginary line.

8. The method of claim 5, further comprising:
disposing the second sealing material in a second area different from the first area; and
disposing a sensor to overlap with the second area.

9. The method of claim 8, wherein the imaginary lines of the first group extend towards the second area.

10. The method of claim 2, wherein the imaginary lines of the first group are of the same length.

11. The method of claim 2, wherein the first substrate comprises:
a display area configured to display an image; and
a non-display area disposed outside the display area,
wherein the first sealing material is disposed in the non-display area.

12. The method of claim 11, further comprising:
a black matrix disposed in the non-display area of the first substrate or the second substrate, the black matrix not being disposed to overlap with the first area.

13. The method of claim 1, wherein:
the first area is disposed in the non-display area;
the first area is spaced apart from the liquid crystal; and
the first sealing material is disposed between the liquid crystal and the second sealing material.

14. A method of manufacturing a display apparatus, comprising:
forming a black matrix on a first substrate or a second substrate;
disposing a first sealing material in a non-display area of the first substrate along an edge of a display area of the first substrate, the non-display area at least partially surrounding the display area;
disposing a second sealing material so as to be in contact with the first sealing material in a first area of the non-display area, the black matrix comprising an opening portion overlapping with a portion of the first area;
disposing liquid crystal in the display area;
disposing the second substrate on the first substrate;
curing the first sealing material and the second sealing material to seal the liquid crystal between the first substrate and the second substrate; and
disposing an image capturing device to overlap with the opening portion in the first area, the second sealing material overlapping with a light receiving aperture of the image capturing device,
wherein the second sealing material is disposed on the first area by a nozzle that dispenses the second sealing material along imaginary lines, each imaginary line comprising a start point and an end point,
wherein the nozzle starts dispensing the second sealing material at respective start points of the imaginary lines and stops dispensing the second sealing material at respective end points of the imaginary lines, and
wherein the second sealing material completely covers the opening portion when viewed in a plan view.

15. The method of claim 14, wherein:
the imaginary lines comprise a first group of imaginary lines arranged substantially parallel to one another; and
the nozzle dispenses the second sealing material in opposite directions in association with adjacent ones of the imaginary lines of the first group.

16. The method of claim 15, wherein the imaginary lines comprise at least one second imaginary line, the at least one second imaginary line comprising a portion extending substantially perpendicular to the imaginary lines of the first group.

17. The method of claim 15, wherein a distance between at least one of the start points and the first area is different from a distance between at least one of the end points and the first area.

18. The method of claim 1, wherein an amount of the second sealing material dispensed in association with a start point is greater than an amount of the second sealing material dispensed in association with an end point.

19. The method of claim 1, wherein respective start points are substantially aligned with one another and respective end points are substantially aligned with one another.

20. The method of claim 2, wherein the second sealing material is simultaneously coated in association with first ones of the imaginary lines in the first group and simultaneously coated in association with second ones of the imaginary lines in the first group.

* * * * *